(12) United States Patent
Van Der Heijden et al.

(10) Patent No.: US 6,880,016 B1
(45) Date of Patent: Apr. 12, 2005

(54) METHOD AND APPARATUS FOR STRUCTURED COMMUNICATION

(75) Inventors: Xander Van Der Heijden, Breda (NL); Robert Deblier, Hasselt (BE); Chip Blank, Breda (NL)

(73) Assignee: X-Way Rights B.V., Veldhoven (NL)

( * ) Notice: Subject to any disclaimer, the term of this patent is extended or adjusted under 35 U.S.C. 154(b) by 0 days.

(21) Appl. No.: 09/529,379

(22) PCT Filed: Oct. 13, 1998

(86) PCT No.: PCT/NL98/00586

§ 371 (c)(1), (2), (4) Date: May 10, 2000

(87) PCT Pub. No.: WO99/20025

PCT Pub. Date: Apr. 22, 1999

(30) Foreign Application Priority Data

Oct. 13, 1997 (EP) .......................................... 97203174

(51) Int. Cl.$^7$ ............................................. G06F 15/16
(52) U.S. Cl. ..................................................... 709/230
(58) Field of Search ................................ 709/230, 224, 709/229, 120, 218, 226, 232, 245

(56) References Cited

U.S. PATENT DOCUMENTS

| | | | |
|---|---|---|---|
| 5,257,369 A | * | 10/1993 | Skeen et al. ................. 719/312 |
| 5,467,472 A | * | 11/1995 | Williams et al. ................ 707/1 |
| 5,530,806 A | * | 6/1996 | Condon et al. ................ 714/49 |
| 5,680,551 A | * | 10/1997 | Martino, II .................. 709/226 |
| 5,758,126 A | * | 5/1998 | Daniels et al. ............... 345/780 |
| 5,867,603 A | * | 2/1999 | Barnsley et al. ............. 382/249 |
| 5,920,822 A | * | 7/1999 | Houde et al. ................ 455/466 |
| 5,960,178 A | * | 9/1999 | Cochinwala et al. ........ 709/232 |
| 6,018,766 A | * | 1/2000 | Samuel et al. ............... 709/218 |
| 6,023,467 A | * | 2/2000 | Abdelhamid et al. .... 370/236.2 |
| 6,101,543 A | * | 8/2000 | Alden et al. ................. 709/229 |
| 6,125,399 A | * | 9/2000 | Hamilton ..................... 709/245 |
| 6,141,686 A | * | 10/2000 | Jackowski et al. .......... 709/224 |

FOREIGN PATENT DOCUMENTS

| | | | |
|---|---|---|---|
| EP | 0 456 249 | 11/1991 | |
| EP | 0909068 A1 | * 4/1999 | ........... H04L/29/06 |
| WO | WO 92/22033 | 12/1992 | |

OTHER PUBLICATIONS

Comer, Douglas E. Internetworking with TCP/IP Principles, Protocols, and Architectures. 1995. Prentice Hall, vol. 1, 4th Edition, Chapters 5, 6, 7, 8, 12, & 13.*
W. Stallings, "IPv6: The New Internet Protocol", pp. 96–108, IEEE Communications Magazine, Jul. 1996.
J. E. White, "ASN.1 and ROS: The Impact of X.400 on OSI", pp. 1060–1072, IEEE Journal on Selected Areas in Communication, No. 7, Sep. 1989.
"LISP 1.5", pp. 417–442, XP–002075365.

* cited by examiner

*Primary Examiner*—Emmanuel L. Moise
*Assistant Examiner*—Christian La Forgia
(74) *Attorney, Agent, or Firm*—Young & Thompson

(57) ABSTRACT

Method of and apparatus for point-to-point communication between a sender (SRV(m)) and a receiver (SRV(m)) by means of messages with flexible message formats (ILMF) wherein any of said messages includes: a header with a least message definition references (MSG ID. MSG CLASS, MSG VERSION, MSG CREATOR), a sender identifier (SENDER ID) and a destination address (DESTINATION ADDRESS); message content regarding: number of fields (FIELD COUNT) and content of any field (FIELD(1), . . . ); number of objects (OBJECT COUNT) and content of any object (OBJECT(1), . . . ); number of field mappings (MAP COUNT) and content of any field mapping (MAP(1), . . . ), any field mapping being usable by predetermined fields; number of actions (ACTION COUNT) and content of any actions (ACTION(1), . . . ), any action being at least usable by predetermined fields.

20 Claims, 3 Drawing Sheets fig-2a

| MSG ID | MSG CLASS | MSG VERSION | MSG CREATOR | |
|---|---|---|---|---|
| SENDER ID | | DESTINATION ADDRESS | | HEADER |
| ENCRYPTION TYPE | COMPRESSION TYPE | APPLICATION NAME | | |
| FIELDCOUNT | FIELD (1) . . . . . . . . . . . | | | |
| OBJECTCOUNT | OBJECT (1) . . . . . . . . . . | | | |
| MAP COUNT | MAP (1) . . . . . . . . . . . . . . | | | |
| ACTION COUNT | ACTION (1) . . . . . . . . . . . . . | | | |
| DIGITAL SIGNATURE | | | | | fig-2b

FIELD

| TYPE | SIZE | NAME | LABEL | DESCRIPTION | DATA -------- | fig-2c

OBJECT

| MIME TYPE | SIZE | DATA -------------- | fig-2d

FIELD MAPPING (MAP)

| FIELD IDENTIFIER | MAPPING TYPE | MAPPING DATA ---------- | fig-2e

ACTIONS

| ACTION TYPE | ACTION DATA ------------------- |

METHOD AND APPARATUS FOR STRUCTURED COMMUNICATION

FIELD OF THE INVENTION

The present invention is in the areas of electronic data communications, database organized, flexible format electronic data message management, client-server and distributed software applications.

In particular, this invention uses a relational database to describe and manage the creation, communication, interpretation, display and real-time responses to flexible format electronic data messages and applications organized as collections of flexible format electronic data messages which may be optionally distributed across one or more computer systems on one or more electronic data networks.

BACKGROUND OF THE INVENTION

General purpose and business specific electronic data communication meets with four distinct problems, each of which has many sub-problems. We will be discussing these issues with regard to business communication needs, although the following points can apply to almost any category of electronic data communications. The four problems are:

1) The electronic data that is sent and received must be clearly recognized for what it is meant to be. Each company has a different way of representing even the most basic business information, an order form or bill of lading, for example.
2) Once electronic data is received from another company and correctly recognized, it must be integrated into the receiving company's databases and business processing programs. Here again, each company has many differences in their database structures, which means the way they represent and store their electronic data on their computer systems.
3) If the electronic data must be displayed to an end user and allow for end user interaction, here again, each company may be using different types of computer display terminals with various types of display software, various system requirements and business requirements. It is very often necessary to build very expensive electronic data display programs with customized graphical user interfaces.
4) There may be the need to execute the processing of computerized business functions in a coordinated manner, distributed across more than one computer system, due to the need to use a combination of specialized system services and their associated data to accomplish specific business functions. This means that a computerized business system might need to exist in more than one location, operate differently in one or more locations, but function, in essence, as if it were one, single system. The solutions to this problem are usually classified as distributed applications or, more recently, distributed object management systems that are classified as "middleware".

There are really two distinct primary issues associated with problem four. The first issue is the need or desire of a company to use the same business application on many different systems, avoiding the need to rewrite the business logic, user interface and network communication interface for each different system that it needs to run on. The second issue is the need to divide the functionality of a single application over more than one system across a communications network, and have it operate in a fully coordinated manner.

There is no single system currently that can solve all of these four problems.

Businesses waste millions of dollars each year, buying, building, rebuilding and maintaining electronic data communication and storage systems that inefficiently and incompletely solve various combinations of these four problems.

PRIOR ART

Problem 1

To solve the first problem, a set of electronic data formats for particular types of information must be agreed upon by all communicating companies before the communication actually takes place. Furthermore, the agreement upon the formats must be actualized by the use of communication software that uses these same exact agreed upon formats. EDI (Electronic Data Interchange) has been one approach to solving this problem. EDI is a set of electronic data message formats for many types of business transactions. The formats are not flexible, meaning they cannot be changed by the users, and there are quite a few different versions of EDI messages. A company could implement an EDI message business communication system and still not be able to exchange electronic data with other companies using a different version EDI message set. The amount of time and money it takes to convert an existing business system to EDI is enormous and it is then difficult and expensive to change to, or add another format if that becomes necessary.

Methods and solutions using hard-coded (i.e. defined in the software) message formats have all of the problems associated with EDI and in essence are the same solution, only with a different fixed message format. Every time that a fixed message format must be changed, this requires a similar change in the software as well as possibly the database and user interface. Even a very small change can sometimes take months. And, of course, this electronic message format must be changed on the computers of every business using that particular format to insure that future electronic communication will continue correctly.

Essentially there will always be the requirement that, in some way, a common data format must be agreed upon by the sender and receiver. This will be present in any method available, now or in the future. The critical issues for the customer are: how fast and cheap it is to build a system around a method (i.e.: EDI) and how easy it is to change a previously agreed upon electronic data format, in every part of the system (database, software, user interface).

Problem 2

The second problem is one that is harder to solve. In general, most companies use large numbers of data entry personnel, who are reading printed material and entering the data that they have read into a computer program running on their terminal that will process this data, convert it to the correct format and place it in the company database. Those companies using EDI or a similar common electronic message format will quite often have paid a very large amount of money for customized software that processes and converts the common electronic message format automatically for them and interacts with their existing database structure for the purpose of data storage and retrieval. If they need to change or add to the common message format, or they need to change or expand their database structure then they must spend time and much money to have this electronic message format database interface program changed and rewritten again.

One newer public domain general purpose solution centers on "mapping" specific data items to specific locations in a customer database or storage device. This mapping is not created in software, but is in some more easily changeable and flexible representation that is separate from the software application and customer database, such as an independent flat file that the software application reads. This eliminates the need to reprogram and rebuild the software application every time the database structure or the data representation changes. Data field mapping techniques are in common use by many database companies such as Progress, Oracle and SQLBase (SQL=Structured Query Language). A version of this well known method is part of the functionality and methodology incorporated into communication apparatus of the present invention.

Problem 3

The third problem has had few easily workable general purpose solutions. One category of solutions requires writing extensive amounts of software code for various window (graphical user interface) management systems such as X-Windows or Microsoft Windows. For large, multi-functional business applications, this approach requires a tremendous amount of time, money and effort, and makes changes or additions to the user interface a very time consuming and costly affair as well.

A new and promising category of solutions centers around the use of HTML (Hyper Text Markup Language) and web browsers, which can dynamically create very nice looking graphical user interfaces, usually called 'web pages', because they are used on the World Wide Web and the internet. This has aroused the interest of many companies. They see how quickly and cheaply very nice looking graphical user interfaces can be built using HTML and they wonder if the user interfaces for their electronic data communication and processing programs could be created in the same way and communicate over the same networks as the web browser systems. In fact, companies would like to be able to use the internet to send and receive the full range of business and personal data and messages.

At the present time there are several systems available that will allow a limited range of business and general data communication over the internet, using HTML and web browsers. The reason that the types of data communication are limited is that the webserver/web browser systems were not designed to provide full data communication services. They were designed as dynamic document retrieval and display systems. They can retrieve information that is first initiated as a request from the user. They do not give the user the capability to send information to one or more destinations, except by extensive additional programming. The capability for sending is not inherent in the system. Examples of this type are Progress' WebSpeed, IBM's WebEDI and SapphireGroup's PageBlazer.

Even the "newer" features of web browsers and webservers that implement the so-called "push" technology only allow the receipt of data, not the sending. And this "receipt" is actually set up as a simulated broadcast receiver, a hidden repeating request for information (polling), by the web browser and webserver systems. The plans to expand this "push" technology only include the use of true broadcast and multi-cast communications technology. Examples of "push" technology are Marimba's Castanet and Tibco's TIB API. This so-called "push" technology is of great interest to advertisers that wish to reach a mass market in a new way, but is of almost no use to the company or individual wishing or needing to use the advanced document display features of HTML and the Internet in the context of fully integrated two way communication of in formation using point-to-point protocols that can be easily integrated into their existing database and business systems.

The webserver and web browser interfaces for the Internet are set up to allow end users to send messages as requests for web pages. At no time will a web browser user be able to send a message to another web browser user, or send a web page to another web browser user, except through electronic mail. At no time will a web browser user ever receive a specific message that was not first asked for; even the so called "push" technology information is requested by polling and the nature of the information, even when it is customized can be compared to a television broadcast or a mass mailing. The information is not being sent to one specific recipient. Contrast this with electronic mail (email), for instance. Using email services one can receive any number of specific, private, messages without asking the sender for them first. One can send any number of specific, private messages to particular recipients, without first being asked. This is the ordinary and necessary nature of messages. Yet the webserver systems of the internet were not designed to communicate like this.

Why then are companies and people so interested in using them this way? Why don't they just use email? The answer is that email does not have any data formatting services built into it (as HTML does) and does not have any user interface generation system built into it (as web browsers do). An email message may also take an indeterminate amount of time (several seconds to several days) to reach its destination and sometimes can get lost. This is unacceptable for standard business electronic data communications. That is why companies and people like the webserver/web browser system, which has a very good data display capability built into it and moderately fast communications. However, as mentioned above it does not have point-to-point communication capability or data representation and mapping capability.

In the present invention the public domain HTML standard may be incorporated as the solution for generating very easily built, fast and flexible graphical user interfaces.

Problem 4

Historically, problem four has been addressed in a general way, until very recently, only by Relational Database Management Systems (RDBMS). This class of solutions has been and is restricted to solving the proper functionality of distributed query and distributed database management and does not address the primary two issues of problem four as described earlier.

A second and newer class of solutions is to be found in systems currently referred to as "middleware" or distributed object management systems. A good example of this is a system called CORBA (Common Object Request Broker Architecture). An excellent set of articles on the development history of CORBA, the goals, current functionality and deficiencies of CORBA 2.0 can be found in Warren Kayffill, "CORBA masterminds object management", p. 42, DBMS magazine, volume 10, number 3, March 1997, and T. J. Hart "Questioning CORBA. Bringing Corba-based designs to life faces a multitude of obstacles", p. 52 in the same issue of DBMS.

This class of solution does not address the database interoperability issues, the common data format issues at the application level or user interface issues. It addresses solely the ability to write an application with standard communication interfaces and standard data at the communication level. Essentially this type of system supplies a development environment, a run-time environment and set of software libraries that allow programmers to create applications that will run on any system and, after defining data structures in the code (so-called objects), these data structures can be exchanged with other software programs that have been coded to recognize and use those particular data structures.

This capability and functionality is, in essence, not any different than a programmer writing a message communication system in Java, which runs on almost any system, and using either EDI messages or some other agreed upon fixed format as a communication medium. The CORBA system does not interpret any messages. The application, written by the programmer, must be able to recognize the message. This leaves a CORBA application with all of the same issues for cost and time of development, alteration and maintenance as an EDI or fixed message format application system. Even the distributed functionality that is possible with CORBA is not inherent in CORBA, but in the skill of the programmer designing and coding the application and use of the CORBA communication libraries. In essence, the only apparent gain of CORBA is the interoperability of part of an application system across many run-time environments, which can perhaps be better gained through other means, such as Java.

In essence, it appears that "middleware" in most cases is in fact just another electronic data communication environment that offers a standardized communication environment and some standardized software functionality on many computers, but fails to address all of the aspects of software application building and so requires the use of system dependent code for database interfaces and user interfaces, thereby defeating the main purpose for the use of a system such as CORBA.

There are some systems that are merging CORBA functionality into Java and also including a standardized database interface called ODBC, or in the Java system JDBC. This is an interesting development, but as the ODBC database interface is only efficient for read-only queries, standard business transaction systems, which require full database access, can not be successfully created. Also, this combination does not address problems one or two at all. In addition, it is not the desired platform on which to build the present invention due to the use of ODBC and the unwieldy overhead of the CORBA object broker system.

Further prior art is known from some patent documents which will be briefly discussed below. U.S. Pat. No. 5,257,369 (Tibco, Inc) discloses "middleware" presented earlier.

In addition, this document provides broadcast functionality and is based upon broadcast functionality. It is primarily to provide a solution to the problem of delivering real-time data to many recipients at once, such as in real-time stock quotes or market information, and does not address point-to-point communications or problems 2 or 3 at all.

The message format is able to be changed and also defined as a data structure or object as described in CORBA earlier. However, this capability does not address the ability to change or add a message format without changing application code, or the ability to map the data of a message format to either a user interface or database fields.

WO 96/20553 (Alphanet Telecom, Inc) focuses upon the enhancement of electronic mail (email) services to include voice mail and facsimile (fax) information. The description of the system is of a centralized service which users can connect to for the receipt of voice mail, email or fax through the Internet, phone or fax machine connecting to the same service. This invention does not address in any way problems 1, 2, 3, or 4, but does address a way of possibly making email more efficient from a communications point of view.

WO 96/34341 (Charles Bobo II) focuses upon a centralized service, that collects, stores and allows access to data for connected users. This is entirely different from the point-to-point communications necessary to solve problems 1 through 4 and for most types of standard business communications. In addition, there are many commercially available systems that have been in existence for many years that already function in exactly this way, such as GEIS and the IBM private data network, to name only two.

EP-0,747,840 A1, EP-0,747,841 A1, EP-0,747,842 A1, EP-0,747,843 A1, EP-0,747,844 A1, and EP-0,747,845 A1 (all of International Business Machines Corporation) are focused upon enhancing the current webserver functionality with some forms of database access and so are therefore still bound by the communications limitations of webservers discussed earlier. Therefore this set of inventions can not solve problems 1 and 4 at all and 2 and 3 in only a limited way. In addition, there are several commercially available systems that appear to offer the same or even more functionality in webserver enhancement such as WebSpeed from Progress Database Corporation.

WO 95/11560 (Sybase, Inc.) is in the category of "middleware" that solves only the problem of creating a consistent electronic data communications software interface which applications may be built upon, regardless of the computer hardware or operating system being used. This document does not address the format of the electronic data being communicated in any manner and so this solution is very similar to CORBA and has all of the same limitations from the point of view of the four problems being addressed by the present invention.

EP 0 421 624 A2 (Texas Instruments Incorporated) is a combination of a "middleware" system such as CORBA, and an application development environment.

Using a database controlled and administered software development environment, the claimed invention allows programmers to develop applications in C, COBOL and SQL.

The database contains information which allows large groups of programmers to develop, modify and use source code control techniques for complex database transaction applications. The database also contains information that allows the application to be recompiled on alternate hardware systems and function in the same manner on, each type of computer, although in this document mostly IBM mainframe systems and some Unix systems are discussed. The end result is a series of hard-coded, compiled applications, with all of the same issues as described in problems 1 and 2 and only partially solving problems 3 and 4.

EP-0,456,249 A2 (Hewlett-Packard Company) is a combination of a "middleware" system such as CORBA, and a partial application development environment whose primary capability is linking existing applications that have been developed in differing higher level programming languages. The higher level languages that are cited in this invention have different run-time in-memory organizations of their data and must transform the data from the organization of one language to another. To this end, an intermediate data representation and data transfer commands are defined that enable the invention, after compiling the data representation and transfer commands, to translate the identified data structures from the runtime representation of one language to another. This invention does not address in any way a message format that contains all of the data and commands necessary to run independently as an application, only the data and commands necessary to translate specified data structures between two pre-existing applications. Therefore, this invention does not address the issues discussed in problems 2 and 3 at all and only partially addresses the issues in problems 1 and 4 at the level of the programming language, not at the level of the application as it has been discussed here. In contrast, in the current invention, the applications are composed entirely of the messages and therefore there is no translation of data from one language to another and no compilation of message formats or commands required; all of the data remains in the message format, whether it is being transmitted or it resides in the computer memory.

Given the above, an urgent need arises for a single system and a way of communicating that can solve each of these four issues and combine the solutions into one unified whole. This would be of great benefit to the individuals and companies that must build complex electronic data communication systems and who must face these issues on a daily basis. Such a system and communication method would reduce the time, cost and complexity of building and maintaining electronic data communication systems drastically.

SUMMARY OF THE INVENTION

To obtain the object referred to above, the present invention is a method of point-to-point communication between a sender and a receiver by means of messages with flexible message formats, characterized in that any of the messages comprises:

a header at least comprising message definition references, a sender identifier and a destination address;
message content regarding:
number of fields and content of any field,
number of objects and content of any object,
number of field mappings and content of any field mapping, any field mapping being usable by predetermined fields,
number of actions and content of any actions, any action being at least usable by predetermined fields.

Consequently, all of the elements for defining application level functionality are present in the message format, which is already in the context of a network communication system and therefore may be easily distributed by simply changing a location and destination address.

Moreover, in accordance with the present invention, a communication apparatus is claimed which comprises processing means and a database, arranged for point-to-point communication with another communication apparatus by means of messages with flexible message formats, the messages comprising:

a header at least comprising message definition references, a sender identifier and a destination address;
message content regarding:
number of fields and content of any field,
number of objects and content of any object,
number of field mappings and content of any field mapping, any field mapping being usable by predetermined fields,
number of actions and content of any actions, any action being at least usable by predetermined fields,
the processing means being arranged for consulting a predetermined message definition table stored in the database using the message definition references as references to the predetermined message definition table.

Thus, in the present invention a flexible message format is defined that can contain any type of data and that contains enough information to fully describe the data within the message itself. Any message comprises message definition references which are used by the claimed communication apparatus receiving the message to identify a message definition preloaded in its database. However, the technology is flexible since the preloaded message definition is not fixed for once and for all. Within the communication apparatus receiving the message, message format specific instances can be created, edited or deleted by inserting, updating or deleting entries in relational database tables which fully describe the message and reference it with a unique identifier. Moreover, if message definitions are absent at a desired location, entire database message definitions may be exchanged automatically for particular messages or groups of messages, thereby creating easily exchanged common format messages for multiple users. A further advantage of the present invention is the small amount of necessary overhead.

Examples of fields within the message definition references are a message identifier for identifying any of the messages, a message class identifier for identifying a message class for any of the messages, like mail, business message, orders or shipping, a message version identifier for identifying a version number of any of the messages, and a message creator identifier for identifying a creator of any of the messages.

Any of these fields within the message definition references have equivalent counterparts within the message definition table in the claimed communication apparatus.

Moreover, headers of messages may include a reference to a type of encryption and/or compression used. Also these references, then, have counterparts in the message definition table in the communication apparatus.

Preferably, the content of messages is protected by digital signatures.

Preferably, the database of the communication apparatus is organized in several tables to which reference is made from the message definition table. Then, the predetermined message definition table comprises a message system identifier for use as a reference to further tables in the database.

One of such further tables may be a field definition table for holding primary definitions for any field of the messages.

Preferably, one of such further tables is a field mapping table comprising mapping information usable by predetermined fields, e.g. for mappings to hyper text markup language fields, database fields, flat file fields and other message fields, said database fields and flat file fields being stored in a customer database. Then, the message format according to the invention contains not only data, but also mapping commands for user interfaces, customer database fields, and sequences of actions including calculations and conditional logic. Consequently, all of the elements for defining application level functionality are present in the message format, which is already in the context of a network communication system and therefore may be easily distributed by simply changing a location and destination address. Moreover, in this way the HTML standard may be incorporated for generating very easily built, fast and flexible graphical user interfaces, allowing a direct mapping to and from the message format defined by the invention, as managed, defined and controlled by the claimed communication apparatus and displayed and interacted with on a user terminal, like a microprocessor, connected to the communication apparatus.

Additionally, one of such further tables may be a field action table comprising the message action links usable by predetermined fields.

Preferably, further tables are a message pre-processing table comprising a list of actions to be executed as pre-processing for a message either received or to be sent and a message post-processing table comprising a list of actions to be executed as post-processing for a message received.

The field action table, the message pre-processing table and the message post-processing table comprise references to types of action selected from the following group of actions: database type of actions and logical type of actions including mathematical calculations, assignments, logical operations, conditional operations, and commands.

Preferably, in the present invention, applications are defined as a named group of one or more messages. To that end, the messages definition table comprises an application field for indicating whether a message received is a first message of an application and an application name field for referring to a name of the application.

In accordance with the present invention, the claimed communication apparatus is, preferably, arranged for requesting a new message definition from a sender if a message received refers to a message definition not present in its database, and receiving said new message definition from said sender and storing it in said message definition table in said database.

The processing means of the communication apparatus may be arranged to either merge a message received with a designated HTML file or if the designated HTML file is not found by the processing means, to create a default dynamic HTML file. However, alternatively, the processing means of the communication apparatus may instruct a connected terminal to carry out these functions. Therefore, the present invention also relates to a system comprising a communication apparatus as defined above and a terminal connected to the communication apparatus, the terminal comprising a terminal processor, a display unit and input means for inputting data by a user, the communication apparatus being arranged for passing a message received to the terminal if the terminal is indicated in the message to be the destination address, and the terminal processor is arranged to either merge the message with a designated HTML file or if the designated HTML file is not found by the terminal processor, to create a default dynamic HTML.

Thus, user terminals that receive a message for which the terminal processor does not have the corresponding message definition can rely upon the system's automatic interpretation and display which is based upon the self-describing information contained within the message received. This same self-describing information can then be used by the terminal processor to automatically create a default database message definition if the database message definition referred to by the message can not be found.

Such a default database message definition can then be edited and adapted to the local system by the terminal user.

The present invention may include a state of the art solution for problems two and three combined in a unique way with completely new solutions to problems one and four, all built around a unique flexible format electronic data message management system composed of the claimed flexible message format and communication apparatus.

The message management system of the present invention, which is defined and controlled by detailed information stored in the tables of a relational database, allows for the most efficient, complete and simple to use way of communicating electronic data in flexible formats. The flexible message format allows the inclusion of any form of electronic data. The flexible message format contains information that allows a receiver to interpret, understand and display the contents of the message, even if it has previously never been received. The receiver can also add this unknown message format to its own message database and link it into its business databases and an HTML user interface very easily and quickly, without writing or changing any software. An HTML user interface can also be dynamically generated by the software of any terminal in the case where there is no specified, previously created HTML file. This addresses the first issue.

In the present invention, an ANSI standard SQL interface to the major relational databases may be provided. This interface provides the service of automatically linking the user selected fields of a data message to the fields in a relational database table, for subsequent storage or retrieval. This data mapping interface can also link to flat file formats such as fixed length fields and CSV (comma separated value) files.

This data mapping interface can be expanded to link message data fields to many other formats, such as SNMP and manufacturing protocols for automatic process control.

This data mapping interface is defined by entries in the ILMDB and controlled by the ILMS. This addresses the second issue.

In the present invention, a message control user interface terminal may be provided, where a user may create, edit, receive, send and view messages. The message control user interface communicates to a network and message management server arranged in accordance with the invention. In essence, the present invention replaces the current webserver/web browser technology for those individuals or companies that need full data communications capability, and expands the system domain to include any data communications network. This allows the full sending and receiving of HTML, VRML and Java applets, as well as any specific data the user has defined to be in a particular message. When combined with the previously described features, this provides the full, database controlled linking between the data in a message, the customer data source it must be retrieved from or stored in, and the graphical user interface (HTML, etc.) it must be displayed with.

In addition to solving the issues described above, the present invention has added the capability of defining automatic, system performed actions, that may be organized as message pre and post processing, or, in the case of messages linked with a graphical user interface, field selection actions. These actions may be defined as SQL or as an "InterLingua™ Script". "InterLingua™ Script" (IS) is defined in the present invention and is a simple, yet powerful set of calculation, execution and conditional logic control statements, that are dynamically interpreted and executed in real-time, and can interact with all message data fields. The actions can generate a new message, call built in system functions and external programs or send and receive database queries. These actions can be used to generate an automatic message response, automatic field validation, perform calculations, run a Java applete or a complex database transaction, for example.

In the present invention we have included the truly unique method of an application being defined as a set of messages and their associated actions. Due to the richness and flexibility of the interaction between the messages; their ability to run database transactions, merge with or generate graphical user interfaces, or run silently in the system as a background process, it is possible to fully define a complex application as a collection of data messages and their associated actions. This also has vast implications in the realm of distributed application processing, as these messages are, by their very nature, sent, received, understood and organized with great ease, as a basic function of the system. This means that for the first time, a distributed application system could easily and flexibly define, without changing or adding any software code, the local user interface and customer data source interface (such as the business database) at each site and still be using the same application (message set).

BRIEF DESCRIPTION OF THE DRAWINGS

The invention will be explained with reference to some drawings which are only intended to illustrate and not to limit the scope of the invention.

FIGS. 2a, 2b, 2c, 2d, and 2e show a message format according to the invention.

DESCRIPTION OF THE PREFERRED EMBODIMENT

Figure 1:
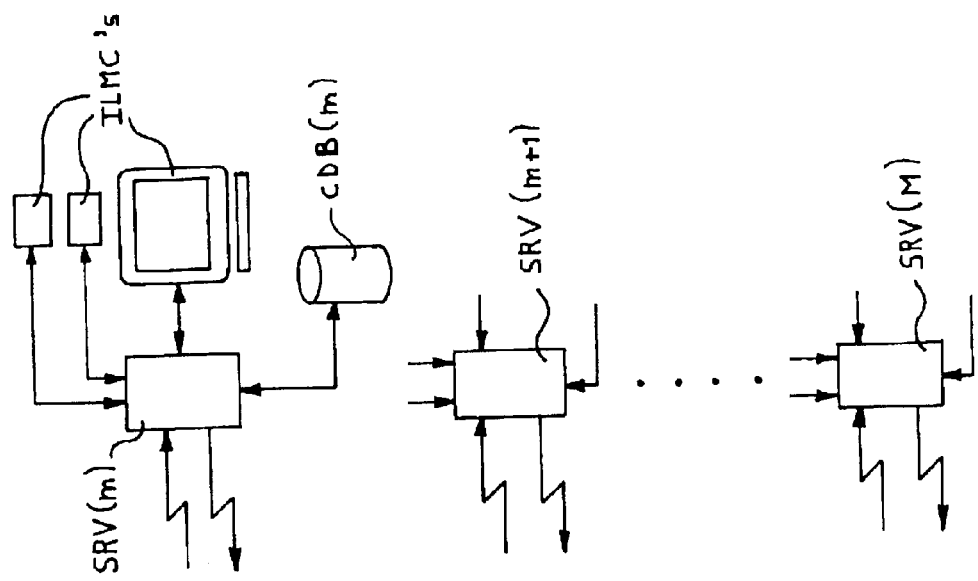
FIG. 1 shows a general overview in block diagram of the system according to the invention.
Figure 1:
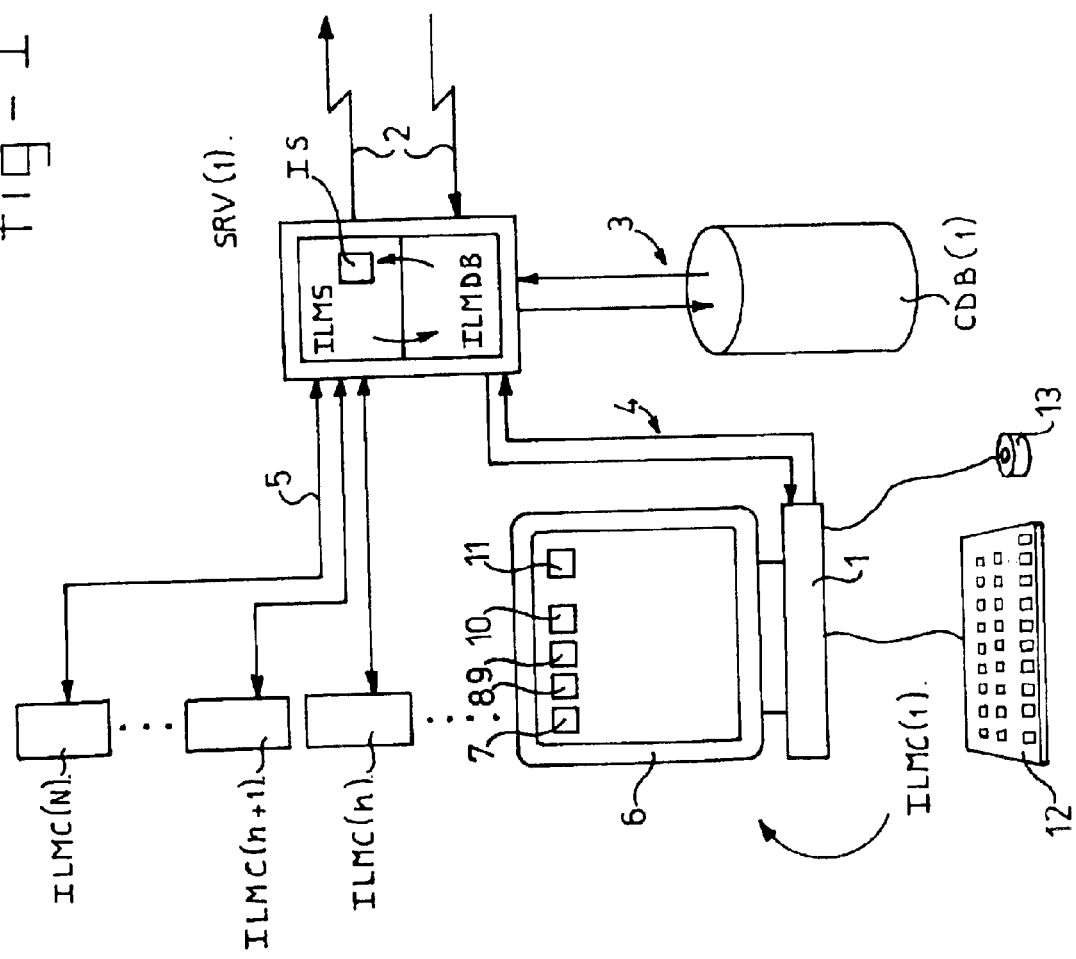

In FIG. 1 a plurality of servers SRV(m), m=1, ..., M, is shown. Any of the servers SRV(m) may be connected to one or more terminals. The terminals connected to server SRV (1) are referred to with ILMC(n), n=1, ..., N. The acronym "ILMC" has been derived from InterLingua™ Message Client. The connections are numbered with references 4, 5.

Moreover, server SRV(1) is connected to a customer database CDB(1). Although one customer database CDB(1) is shown, more than one can be applied as required.

Terminal ILMC(1) has been depicted in greater detail in FIG. 1. Terminal ILMC (1) is shown to include a monitor screen 6, a processing unit 1, a keyboard 12, and a mouse 13. The keyboard 12 and the mouse 13 are connected to the processing unit 1. Of course, any other known means for inputting data to the processing unit 1 by a user is possible instead of or in addition to the keyboard 12 and the mouse 13.

The monitor screen 6 shows some "buttons" 7, 8, 9, 10, and 11. These buttons can be acted upon by the user by means of the mouse 13 to instruct the processing unit 1 to carry out predetermined tasks. Such predetermined tasks may be the opening of options, establishing connections, sending messages, receiving messages, and/or loading of data into the memory of the processing unit 1.

The server SRV(I) is provided with a processor called InterLingua™ message server ILMS for receiving, passing or sending messages in accordance with the method of the present invention. Part of the ILMS processor is indicated with IS (=InterLingua™ Script), the function of which will be explained later.

Server SRV(L) also comprises a database ILMDB (=InterLingua™Message Database) for storing several tables in accordance with the present invention, as will be explained later.

The server SRV(1) is arranged for point-to-point communication with one other server through a communication path 2. The communication path 2 may be established in any known way, i.e., either by wires or wireless.

FIG. 1 shows several other servers SRV(m) connected to one or more terminals ILMC's. These further servers SRV (m) are organized in accordance with the present invention further explained in detail below.

FIGS. 2a, 2b, 2c, 2d, and 2e show a message format. In FIG. 2a, the message format is shown to include four fields MSG Id, MSG Class, MSG Version and MSG Creator, used as message definition references by any apparatus receiving the message.

The field MSG Id is to identify the message.

The MSG Class is used to designate a category or type of message, like mail, business message, orders, or shipping.

The field MSG VERSION comprises a message version identifier for identifying a version number of the message concerned.

The fourth field MSG CREATOR comprises a message creator identifier for identifying a creator of the message concerned.

The MSG Id, Class and Version fields are integer values. There are, e.g., 1,000,000 MSG Ids per MSG Class and 10,000 MSG Classes. Every MSG Id, MSG Class pair can have, e.g., 100 MSG Versions. MSG Classes may e.g. be arranged as follows. MSG Classes 1 to 20 are reserved for the ILMS. MSG Classes 21–100 are pre-defined categories such as order placement, shipping, etc. The 9900 remaining MSG Classes are for user definition. The MSG Creator may e.g. have 80 characters.

This is for the purpose of identifying entire message sets created by particular users or companies for easy automatic transfer.

Together with five more fields these message definition references form a header to the message. These five more fields are: SENDER Id, DESTINATION ADDRESS, ENCRYPTION TYPE, COMPRESSION TYPE, and APPLICATION NAME.

The Sender Id is the user name as recognized by the server SRV(m) with the name of the server SRV(m) appended, e.g., in a manner similar to an email address (i.e. user-xyz@ilserver.com). The field DESTINATION ADDRESS is for identifying the address to which the message concerned is to be transmitted. The destination address may be of the same format as the SENDER Id.

The field ENCRYPTION TYPE is used for a reference to a type of encryption applied, if one is required. The field COMPRESSION TYPE is to indicate the type of compression used, if required.

The field APPLICATION NAME is used for indicating whether or not the message concerned is member of a series of messages which together form one application.

The Field Count gives the number of fields, e.g., from 0 to 256 in the message. A "field" and its content refer to a particular type of data and the data itself. The actual field data follows this field, if the count is more than 0. With reference to FIG. 2b, a field is defined by a Type identifier, a Size value, a field Name for internal identification, a field Label for default display, and a field Description, also for default display. The length of data following is known by combining the information of the Type and Size fields. One field definition follows directly after another with no additional separators.

Very often, particularly in HTML type data, there is a reference to a local file containing binary image, sound or program data. To insure the correct transfer and referencing of these referenced external objects, they are automatically grouped at the end of the message, as shown in FIG. 2a. The fields that reference them are made to point to the objects. When the message is received, these objects are automatically stored locally and the field references are automatically adjusted to access the objects in their new location.

The Object Count field gives the number of objects in the message from 0 to 256. The object data follows this field, if the count is more than 0. An Object is, preferably, defined by a MIME Type/Content identifier, a Size value and then the actual Object Data, as shown in FIG. 2c. One Object definition follows directly after another, with no additional separators.

With reference to FIG. 2d, a field mapping is e.g. defined by a FIELD IDENTIFIER, a MAPPING TYPE, and MAPPING DATA.

As FIG. 2e shows, actions can be simply defined by ACTION TYPE followed by ACTION DATA.

A digital signature, using a server SRV key, is, preferably, created on the entire message and added at the end of the Object list.

The allowed data types as defined in FIGS. 2a, 2b, 2c, 2d, and 2e are for instance:

1) Unicode character strings;
2) Computer hardware independent integers of any size;
3) IEEE 8-byte format floating point numbers;
4) Universal Resource Locators (URL);
5) Image data in GIF or JPEG format; and
6) MIME specified data representations.

In actuality, GIF and JPEG data are also included as MIME types. The decision to make a specific data type for images in these formats was driven by the frequency of their use in HTML types of display systems. The most commonly used data types have their own definition. Any additional data types can be included as existing MIME types or specific MIME extensions. These data types are specified by way of example only. The scope of protection of the present is not intended to be limited by the type of data preferred.

Each message may have its own digital signature and optional encryption and/or compression, which is managed automatically by the server SRV(m).

Message Database

A flexible message format definition, management and control system is implemented using database ILMDB as a relational database as a holder of a) detailed message definitions;
b) message mapping instructions;
  b.1) mapping to customer database fields;
  b.2) mapping to customer flat file formats;
  b.3) mapping to customer user interface (HTML) fields; and
  b. 4) mapping to other message fields;
c) message action lists: (SQL, Java, calculations, logic flow, message calls, external program calls)
  c.1) message pre-processing actions;
  c.2) message post-processing actions;
  c.3) message field user interface event actions.

This information is held in tables in the relational database ILMDB and allows the system to fully interpret and process any message. New message definitions may be added and old definitions may be changed. Message definitions may be sent from one server SRV(M) to another for immediate incorporation into the message database ILMDB. Every flexible message format includes enough self-description information in itself to allow a server SRV(m) to interpret a previously unseen message and create a new message definition entry in the ILMDB for it automatically. This new message definition may be edited and enhanced by a system administrator, to complete the mapping into the receiver's system.

Message data is not kept in the database ILMDB, only the definition. The message data is kept in compressed files on a disk storage system. These files are periodically either archived or deleted according to the server message duration options chosen by the system administrator.

The primary relational tables within the database ILMDB needed to define and control a message either received or to be sent are as follows:

| Table Name | Description |
| --- | --- |
| msgdef | InterLingua ™ Message Definition |
| flddef | Message Field Definition |
| fldmap | Field Mapping |
| fldact | Field Action Definition (one action per field) |
| msgpre | Message Pre-processing (sequence of message actions) |
| msgpost | Message Post-processing (sequence of message actions) |

System developers skilled in the art will recognize that there are many other tables of related information necessary to make an entire system more easily usable, and control secondary system features. Examples of this might be all of the tables associated with user accounts and user information, system administration and system security. The tables presented here are the core tables necessary for implementing the present invention in accordance with the preferred embodiment, and extensions or enhancements are considered to be within the scope of the present invention as well.

Table: msgdef

This table is responsible for holding the primary definition of a message. A message is completely identified by the first four fields of this table, which are also in the message header (cf. FIG. 2a). The fifth field (msysid) is an identifier that is assigned internally by the server processor ILMS, and is used as a reference for identification of and fast access to other tables within the database.

| Field Name | Type | Description |
| --- | --- | --- |
| msgid | integer | Message Identifier |
| msgver | integer | Message Version |
| msgclass | integer | Message Class |
| creatid | char | Creator Identifier |
| msysid | integer | Message System Id |
| creatdate | date | Date Created |
| usedate | date | Date Used |
| These two fields control how long a message is stored by the ILMS. | | |
| durdays | integer | Duration Days |
| durmins | integer | Duration Minutes |
| These two fields identify the type of encryption and digital signature algorithm. | | |
| encrtype | char | Encryption Type |
| sigtype | char | Digital Signature Type |
| This field indicates whether the message is for display or not. | | |
| silent | boolean | Message Silent Flag |
| This field indicates whether the message can initiate or respond to actions. | | |
| active | boolean | Processing Enable Flag |
| msgicon | char | Message Icon File (for ILMC display) |
| msghtml | char | Message HTML File (for ILMC display) |

-continued

| Field Name | Type | Description |
|---|---|---|
| This field indicates whether the message is the first in an application. | | |
| appmain | boolean | Application Main Flag |
| This field contains a name if the message is part of an application. | | |
| appname | char | Application Name |
| descr | char | Message Description |

Table: flddef

This table is responsible for holding the primary definition for all fields of all messages. A field is uniquely identified by the 'msysid' assigned in the 'msgdef' table and either a field sequence number (fldseq) or a field name (fldname).

| Field Name | Type | Description |
|---|---|---|
| msysid | integer | Message System Id |
| fldseq | integer | Field Sequence |
| fldname | char | Field Name |
| These three fields are used to create 1, 2 (tables), or 3 dimensional arrays. | | |
| ar1 | integer | Array Dimension 1 |
| ar2 | integer | Array Dimension 2 |
| ar3 | integer | Array Dimension 3 |
| fldtype | char | Field Data Type |
| The field size is interpreted differently, depending on the data type. | | |
| fldsize | integer | Field Size |
| This field is used if the field is a reference to another message as a data structure. | | |
| smsysid | integer | Sub-Message System Id |
| These two fields are used if the field contains MIME data. | | |
| mimecont | char | MIME Content Identifier |
| mimetype | char | MIME Type Identifier |
| fldlabel | char | Field Label (for ILMC display) |
| fldcom | char | Field Comment (for ILMC display) |

Table: fldmap

This table is responsible for holding any mapping information that a field might use. This table can define mappings to database fields, flat file fields and other message fields. The field is identified in the same manner as table 'flddef'. There is one mapping for data and one mapping for display allowed for each field, except in the case where a field is defined as an array. A data and display mapping can be assigned to one or more elements or dimensional rows of an array.

| Field Name | Type | Description |
|---|---|---|
| msysid | integer | Message System Id |
| fldseq | integer | Field Sequence |
| fldname | char | Field Name |
| These three fields allow mappings to specific array elements or dimension rows. | | |
| ar1 | integer | Array Dimension 1 |
| ar2 | integer | Array Dimension 2 |
| ar3 | integer | Array Dimension 3 |

-continued

| Field Name | Type | Description |
|---|---|---|
| This field allows the data to be transferred from the most recently active previous message within the same message context, which is the set of currently active messages for a particular user connection. | | |
| cpyfld | char | Copy Field (From Msg) |
| These three fields are used to specify a particular field in a SQL accessible relational database. | | |
| dbnam | char | Database Name |
| tblnam | char | Table Name |
| fldnam | char | Field Name |
| This field specifies a field in an HTML file (msgdef.msghtml) for display. | | |
| tagnam | char | HTML Tag Name |
| These two fields specify a flat file of either fixed field lengths, or comma separated values. | | |
| flatfile | char | Flat File Name |
| filetype | char | File Type (Fixed, CSV) |
| These four fields specify the field location for the flat file. | | |
| rowbegin | integer | Row Begin |
| colbegin | integer | Column Begin (or Field # for CSV) |
| rowend | integer | Row End |
| colend | integer | Column End |

Table: fldact

This table is responsible for holding any action information that a field might use. Actions may be database type of actions and logical type of actions. There is one action per field, except in the case where a field is defined as an array. An action can be assigned to one or more elements or dimensional rows of an array.

| Field Name | Type | Description |
|---|---|---|
| msysid | integer | Message System Id |
| fldseq | integer | Field Sequence |
| fldname | char | Field Name |
| ar1 | integer | Array Dimension 1 |
| ar2 | integer | Array Dimension 2 |
| ar3 | integer | Array Dimension 3 |
| This field defines the action type : SQL or IS, file or local. | | |
| acttype | char | Action Type |
| This field contains SQL, IS or a file name whose contents are SQL or IS. | | |
| actscript | char | Action Script |

Tables: msgpre and msgpost

The two tables msgpre and msgpost have an identical structure. Table 'msgpre' holds the list of actions to be executed by server processor ILMS as preprocessing for a particular message. This means before any display or field actions take place, the server processor ILMS completes the list or pre-process functions.

Table 'msgpost' holds the list of actions to be executed by the server processor ILMS as post-processing for a particular message. This means that after all other message actions and displays have completed, the server processor ILMS completes the list of post-process functions before deleting the message from main memory. The process sequence number is used to create a controlled execution of the list of actions. A previous sequence number must complete before the next one can begin. If there is more than one action with the same sequence number, they are started at the same time, or, within a multiple CPU or massively parallel environment, as true parallel processes.

TABLE msgpre

| Field Name | Type | Description |
| --- | --- | --- |
| msysid | integer | Message System Id |
| procseq | integer | Process Sequence |
| This field defines the action type: SQL or IS, file or local. | | |
| proctype | char | Pre-processType |
| This field contains SQL, IS or a file name whose contents are SQL or IS. | | |
| proscript | char | Pre-process Script |

TABLE msgpost

| Field Name | Type | Description |
| --- | --- | --- |
| msysid | integer | Message System Id |
| procseq | integer | Processing Sequence |
| This field defines the action type: SQLor IS, file or local. | | |
| proctype | char | Post-processType |
| This field contains SQL, IS or a file name whose contents are SQL or IS. | | |
| procscript | char | Post-process Script |

InterLingua™ Script (Action Definition and Control Language)

Any action, for either message pre-processing, post-processing or field actions can be either an SQL-action or IS-action. SQL (Structured Query Language) is an ANSI standard interface language for relational databases. IS (InterLingua™ Script) is a predetermined part of the server processor ILMS (cf. FIG. 1) and is a small, but powerful set of calculation, execution and conditional logic statements that give application level functionality to a message. In a preferred embodiment, the definition of IS is as follows:

Calculation

The operations of add (+), subtract (−), multiply (*) and divide (/) are allowed upon integers and floating point values. Parenthesis "( )" are allowed for grouping mathematical operations.

Assignment

Assignment (=) is allowed to integers, floating point values, strings and URLs.

Logical and Conditional

Symbols representing: and (AND), or (OR), greater than (>), less than (<), greater than or equal to (>=), less than or equal to (<=), equality (=), not equal (!=), and negation (!) are allowed upon integers, floating point values, strings and URLs.

Control Flow

END-MSG—End a message. Must be last command from its own pre-processing list.

END-APP—End an application. Must be last command from a member message post-processing list.

For Loop:
    FOR i = x TO y
    BEGIN
        < statements >
    END

While Loop:
    WHILE < condition >
    BEGIN
        < statements >
    END
If-Then-Else:
    IF < condition > THEN
    BEGIN
        < statements >
    END
    ELSE
    BEGIN
        < statements >
    END Command Load mapped field data:

LOAD{WHERE<external field name >=<value>}

Store mapped field data:

STORE{WHERE<external field name >=<value>}

Execute external program:

CALL[JAVA EXEC SHELL]<program name><parameter 1> . . . <parameter n>

Execute message:

ILMP://<host-name>/<message id>

Execute internal function (this is used mostly for user interface events):

ILMP://<host-name>/<message id>/<field id>[UI-ACT|MSG-END|APP-END]

ILMP://<host-name>/<message id>/<field id>[ADD-DATA|DEL-DATA|CHG-DATA]<data>.

Applications

A collection of InterLingua™ messages may be grouped together, uniquely named and used as an InterLingua™ application. For the purposes of this discussion, for any programming language or system platform, an application is defined as being one or more functions whose sequence of operation may vary depending upon input data and user and system events; that can access and interact with external storage devices; and that can interact with users through a user interface.

All or part of this named set of messages may reside on one or more servers SRV(m) in one or more locations. This named set of messages, or application, implements:

a) a directed series of functions b) local and shared data c) user interface screens d) networked distributed application functionality.

The directed series of functions may include any of the action types, such as database queries, calculations and the activation of additional messages. Activating a message in this context can be used for the equivalent of calling an application function, displaying the next user interface screen, or, of course, sending a message to a local or external network destination. The real-time structured flow of the order of operations, or, in other words, the directed series of functions, is determined by the message action lists and also event actions generated by the user interface, such as a mouse selection of a field or a button.

The local and shared data includes any of the allowed data types. These data types may be grouped into data structures. This message data may be mapped to and from user databases, user interfaces and passed to other messages. This concept makes use of a message as a function that may have its own local data and may call other functions (messages)

to which it may pass any local data. When this local data is passed between two or more messages it becomes shared data.

The networked distributed application functionality is implemented by using the inherent capabilities of the InterLingua™ clients ILMC(n) and servers as message senders and receivers. If an application set is created to run in a distributed manner across several servers as contrasted to a single application on one server, the primary difference will be that one or more of the messages acting as an application function will have a remote server as its destination, rather than the local server. This makes the creation of networked distributed applications very straightforward, with a simplicity and flexibility that has not been seen before.

InterLingua™ Message Client (ILMC) and Server SRV

The software of the InterLingua™ Message Client (ILMC) is, preferably, written entirely in Java, thus ensuring that it can run on any Java enabled computer system, which includes almost all of the most commonly used computers. The ILMC functions as an HTML/VRML/Java Applete display console and as a network communication interface to the server SRV(m).

The user interface screens make use of the ability to associate a message with an HTML definition and map the data between the message and the HTML display. This allows the chosen functions (messages) to have a user interface as necessary. User keyboard and mouse events are linked to field actions.

The communication sub-system, implementing the message send/receive functions from one server to an other server and between a server and a terminal ILMC, is designed to work in a highly optimized, multi-threaded fashion, and replaces the use of checksums for monitoring message integrity with the use of digital signatures. This allows for complete confirmation of the non-corrupted state of the received message and, at the same time, the security verification of the identity and authenticity of the sender. The communication sub-system exists in both the server SRV and the terminal ILMC. The communication subsystem is designed to be network protocol independent. In its current version it will run on TCP/IP, XTP/IP and XTP/ATM/AAL5, but it will just as easily run on AppleTalk, IPX, SNA, X.25, DECNET, OSI or any other protocol that can use a socket interface and point-to-point addressing scheme.

The communication sub-system is not a critical part of the present invention. The advances of the present invention may be implemented over many different types of communication sub-systems. Those skilled in the art will recognize that the type and implementation details of the chosen network communications sub-system will not change the functionality of the present invention, as long as the communication subsystem has a reliable delivery protocol that can guarantee a high rate of delivery success and data integrity.

A message priority scheduling and service mechanism as described and claimed in European Patent Application 97202945.8, now EP-A-0905949, published after the date of priority of the present invention, may be added to the communication sub-system. This mechanism uses separate connections for individual priority levels and a simple network and system buffering algorithm to automatically guarantee fair service for all message priority levels. This mechanism delivers high priority messages faster consistently, without the need for a complex scheduling algorithm to monitor message sizes or prevent lower priority message lock-out.

Receiving a Message

When a message is received by a server SRV(m), it will pass through the communication sub-system. The digital signature will be verified and the transport layer header will be stripped. If the message has been encrypted or compressed it will be decrypted or decompressed at this time. The message will then be passed to the database layer ILMDB.

If message definitions are absent at a desired location, entire database message definitions may be exchanged automatically for particular messages or groups of messages, thereby creating easily exchanged common format messages for multiple users.

Alternatively, if a message definition does not exist for the message received it will be sent to the in-box of the system administrator. The system administrator can then examine the message using a terminal ILMC, automatically add the basic message definition and link the message fields to local database fields and HTML display fields as necessary. The system administrator may also automatically request that the sender of the message send the complete message definition which will then automatic ally be placed in the local database ILMDB. This request is sent out as a message from one server to another server.

If a message definition exists for the message received, it will be read from the database ILMDB. The message pre-processing action lists will be executed by the server SRV(m), enacting functions such as message field validation, database queries, calculations and other messages. If the message is sent to a user for display, the processor 1 of terminal ILMC will either merge the message with the designated HTML file or if the designated HTML file is not found by processor 1, it will create a default dynamic HTML. The field actions may be activated by specific mouse and keyboard events if they have been defined in the message. Field actions may call a standard HTTP URL, send a request for the display of local image, activate a SQL database transaction, update local display data or run an InterLingua™ Script (IS) command. If the message has no user interface defined it is referred to as "silent", and its presence in the system can only be seen by the system administrator.

At the completion of the silent message pre-processing and encountering an END-MSG command or the terminal message user interface sends an END-MSG command, the message post-processing action lists will be executed by the server SRV(m). If the message is part of an application set, it will remain active and in memory until the server SRV(m) encounters or receives an END-APP. When an application set completes, all member message post-processing lists will be executed by the server SRV(m) if they have not yet been executed. This functionality also guarantees the automatic maintenance of transaction context and application data and state. When a single message or application set completes, the system memory will be cleaned and returned for use by other messages and applications.

Sending a Message

From a terminal ILMC:
A message format (ILMF) has been requested and received from the ILMDB/ILMS. The message content and address has been added by the terminal user. The terminal user initiates a message send, through a user interface action, to the server on which the user is registered.

From a server SRV(m):
A message may be initiated automatically as the result of a direct call to activate a message on the server SRV(m)

through InterLingua™ Script (IS), or may be the request of a connected terminal which is first received and processed by the server SRV(m). The server performs the message pre-processing if any is defined. If the destination address is for the server itself, the message post processing is executed after encountering or receiving an END-MSG, then the message is terminated. If the destination address is for another server then the message is passed to the communication sub-system, compressed or encrypted, given a digital signature and then sent through a point-to-point connection to the receiving server.

LIST OF ACRONYMS

ANSI=American National Standard Institute
CORBA=Common Object Request Broker Architecture
CSV=Comma Separated Value
EDI=Electronic Data Interchange
GIF=Graphics Interchange Format
HTML=Hyper Text Markup Language
HTTP=HyperText Transfer Protocol
ILMC=InterLingua™ Message Client
ILMDB=InterLingua™ Message Database
ILMF=InterLingua™ Message Format
ILMP=InterLingua™ Message Protocol
ILMS=InterLingua™ Message Server
IS=InterLingua™ Message Script
JDBC=Java DataBase Connectivity
JPEG=Joint Photographers Expert Group
MIME=Multi-purpose Internet Mail Extensions
ODBC=Open DataBase Connectivity
RDBMS=Relational Database Management Systems
SNMP=Simple Network Management Protocol
SQL=Structured Query Language
URL=Universal Resource Locator
VRML=Virtual Reality Markup Language

What is claimed is:

1. A communication apparatus, comprising:
messages;
processing means (ILMS); and
a database (ILMDB), the processing means and the database arranged for point-to-point communication with another communication apparatus (SRV(m)) by means of the messages
the messages having flexible message formats (ILMF), and comprising
a header comprising message definition references (MSG ID, MSG CLASS, MSG VERSION, MSG CREATOR), a sender identifier (SENDER ID) and a destination address (DESTINATION ADDRESS); and
a message content including:
a number of fields (FIELD COUNT) and a content of any field (FIELD(1), . . . ),
a number of objects (OBJECT COUNT) and a content of any object (OBJECT(1), . . . ), the objects being referred to by one or more of the fields;
a number of field mappings and a content of any field mapping, any field mapping being usable by predetermined fields,
a number of actions and a content of any actions, any action being usable by the predetermined fields, wherein, said database (ILMDB) stores a predetermined message definition table (msgdef), a field definition table (flddef), mapping instructions (fldmap) and message action lists (fldact, msgpre, msgpost); and said processing means (ILMS) is arranged to interpret and process the messages while consulting said predetermined message definition table (msgdef), mapping instructions (fldmap) and message action lists (fldact, msgpre, msgpost) stored in said database (ILMDB) using said message definition references as references to said predetermined message definitions;

said predetermined message definition table (msgdef) comprises a message system identifier (msysid) for use as a reference to further tables in said database (ILMDB), said further tables comprise a field action table (fldact) comprising said message action lists usable by predetermined fields, and said further tables comprise a message pre-processing table (msgpre) comprising a list of actions to be executed as pre-processing for a message either received or to be send and a message post-processing (msgpost) comprising a list of actions to be executed as post-processing for a message received.

2. A communication apparatus according to claim 1, wherein said predetermined message definition table (msgdef) comprises a message identifier (msgid) for identifying messages.

3. A communication apparatus according to claim 1, wherein said predetermined message definition table (msgfdef) comprises a message class identifier (msgclass) for identifying a message class for any of the messages.

4. A communication apparatus according to claim 3, wherein said message may be any of mail, business message, and orders for shipping.

5. A communication apparatus according to claim 1, wherein said predetermined message definition table (msgdef) comprises a message version identifier (msgver) for identifying a version number of the messages.

6. A communication apparatus according to claim 1, wherein said predetermined message definition table (msgdef) comprises a message creator identifier (creatid) for identifying a creator of the messages.

7. A communication apparatus according to claim 1, wherein said predetermined message definition table (msgdef) comprises a reference to a type of encryption (encrtype) applied.

8. A communication apparatus according to claim 1, wherein said predetermined message definition table (msgdef) comprises a reference to a digital signature type (sigtype) applied.

9. A communication apparatus according to claim 1, wherein said further tables comprise a field definition table (flddef) for holding primary definitions for any field of said messages.

10. A communication apparatus according to claim 1, wherein said further tables comprise a field mapping table (fldmap) comprising said mapping instructions usable by predetermined fields.

11. A communication apparatus according to claim 10, wherein said predetermined fields may be any of mappings to hyper text markup language fields, database fields, flat file fields and other message fields.

12. A communication apparatus according to claim 1, wherein said field action table (fldact), said message pre-processing table (msgpre) and said message post-processing table (msgpost) comprise references to types of actions selected from the following group of actions: database type of actions and logical type of actions including mathematical calculations, assignments, logical operations and conditional operations, and commands.

13. A communication apparatus according to claim 1, arranged for requesting a new message definition from a sender if a message received refers to a message definition not present in said database (ILMDB), and receiving said new message definition from said sender and storing the received new message definition in said message definition table (msgdef) in said database (ILMDB).

14. A communication apparatus according to claim 1, arranged to interpret a previously unseen message and to create a new message definition entry in said database (ILMDB).

15. A communication apparatus, comprising:

messages;

processing means (ILMS); and a database (ILMDB), the processing means and the database arranged for point-to-point communication with another communication apparatus (SRV(m)) by means of the messages the messages having flexible message formats (ILMF), and comprising a header comprising message definition references (MSG ID, MSG CLASS, MSG VERSION, MSG CREATOR), a sender identifier (SENDER ID) and a destination address (DESTINATION ADDRESS); and a message content including:

a number of fields (FIELD COUNT) and a content of any field (FIELD(1), . . . ), a number of objects (OBJECT COUNT) and a content of any object (OBJECT(1), . . . ), the objects being referred to by one or more of the fields, a number of field mappings and a content of any field mapping, any field mapping being usable by predetermined fields, a number of actions and a content of any actions, any action being usable by the predetermined fields, wherein, said database (ILMDB) stores a predetermined message definition table (msgdef), a field definition table (flddef), mapping instructions (fldmap) and message action lists (fldact, msqpre, msgpost), said processing means (ILMS) is arranged to interpret and process the messages while consulting said predetermined message definition table (msgdef), mapping instructions (fldmap) and message action lists (fldact, msgpre, msgpost) stored in said database (ILMDB) using said message definition references as references to said predetermined message definitions, and said message definition table (msgdef) comprises an application field (appmain) for indicating whether a message received is a first message of an application and an application name field (appname) for referring to a name of said application, in order to define the application as a collection of data messages and their associated actions.

16. A communication apparatus according to claim 15, wherein said application is a distributed application distributed over a plurality of communication apparatuses.

17. A communication apparatus according to claim 15, arranged for requesting a new message definition from a sender if a message received refers to a message definition not present in said database (ILMDB), and receiving said new message definition from said sender and storing the received new message definition in said message definition table (msgdef) in said database (ILMDB).

18. A communication apparatus according to claim 15, arranged to interpret a previously unseen message and to create a new message definition entry in said database (ILMDB).

19. A communication apparatus, comprising:

messages;

processing means (ILMS); and a database (ILMDB), the processing means and the database arranged for point-to-point communication with another communication apparatus (SRV(m)) by means of the messages the messages having flexible message formats (ILMF), and comprising a header comprising message definition references (MSG ID, MSG CLASS, MSG VERSION, MSG CREATOR), a sender identifier (SENDER ID) and a destination address (DESTINATION ADDRESS); and a message content including:

a number of fields (FIELD COUNT) and a content of any field (FIELD(1), . . . ), a number of objects (OBJECT COUNT) and a content of any object (OBJECT(1), . . . ), the objects being referred to by one or more of the fields, a number of field mappings and a content of any field mapping, any field mapping being usable by predetermined fields, a number of actions and a content of any actions, any action being usable by the predetermined fields, wherein, said database (ILMDB) stores a predetermined message definition table (msgdef), a field definition table (flddef), mapping instructions (fldmap) and message action lists (fldact, msgpre, msgpost), said processing means (ILMS) is arranged to interpret and process the messages while consulting said predetermined message definition table (msgdef), mapping instructions (fldmap) and message action lists (fldact, msgpre, msgpost) stored in said database (ILMDB) using said message definition references as references to said predetermined message definitions, and said processing means (ILMS) are arranged to either merge a message received with a designated HTML file or if the designated HTML file is not found by the processing means (ILMS), to create a default dynamic HTML file.

20. A system comprising a communication apparatus (SRV(m)) and a terminal (ILMC) connected to said communication apparatus, said terminal comprising a terminal processor (1), a display unit (6) and input means (12, 13) for inputting data by a user, said communication apparatus being arranged for passing a message received to said terminal if said terminal is indicated in the message to be the destination address, and said terminal processor (1) is arranged to either merge the message with a designated HTML file or if the designated HTML file is not found by the terminal processor (1), to create a default dynamic HTML, said communication apparatus comprising:

messages;

processing means (ILMS); and a database (ILMDB), the processing means and the database arranged for point-to-point communication with another communication apparatus (SRV(m)) by means of the messages the messages having flexible message formats (ILMF), and comprising a header comprising message definition references (MSG ID, MSG CLASS, MSG VERSION, MSG CREATOR), a sender identifier (SENDER ID) and a destination address (DESTINATION ADDRESS); and a message content including:

a number of fields (FIELD COUNT) and a content of any field (FIELD(1), . . . ), a number of objects (OBJECT COUNT) and a content of any object (OBJECT(1), . . . ), the objects being referred to by one or more of the fields, a number of field mappings and a content of any field mapping, any field mapping being usable by predetermined fields, a number of actions and a content of any actions, any action being usable by the predetermined fields, wherein, said database (ILMDB) stores a predetermined message definition table (msqdef), a field definition table (flddef), mapping instructions (fldmap) and message action lists (fldact, msgpre, msgpost); and said processing means (ILMS) is arranged to interpret and process the messages while consulting said predetermined message definition table (msgdef), mapping instructions (fldmap) and message action lists (fldact, msgpre, msgpost) stored in said database (ILMDB) using said message definition references as references to said predetermined message definitions.

* * * * *